United States Patent
Saul et al.

(10) Patent No.: US 10,933,353 B2
(45) Date of Patent: Mar. 2, 2021

(54) ENHANCED SHAPE SUPPORT GRID

(71) Applicant: Aqseptence Group, Inc., New Brighton, MN (US)

(72) Inventors: Garth Hayes Saul, Faribault, MN (US); Robert Glen Norell, New Brighton, MN (US); Dean Gerald Brabec, North Branch, MN (US); Benjamin Schmitt, Coon Rapids, MN (US); Dusan Visekruna, Woodbury, MN (US); Michael Richard Ekholm, Minneapolis, MN (US); Eugene Eberhardt, Buffalo, MN (US); Edmund M. Wolfe, Brooklyn Park, MN (US)

(73) Assignee: Aqseptence Group, Inc., New Brighton, MN (US)

( * ) Notice: Subject to any disclaimer, the term of this patent is extended or adjusted under 35 U.S.C. 154(b) by 40 days.

(21) Appl. No.: 13/952,113

(22) Filed: Jul. 26, 2013

(65) Prior Publication Data
US 2014/0027369 A1 Jan. 30, 2014

Related U.S. Application Data

(60) Provisional application No. 61/676,156, filed on Jul. 26, 2012, provisional application No. 61/809,091, filed on Apr. 5, 2013.

(51) Int. Cl.
*B01D 39/12* (2006.01)
*B01D 24/06* (2006.01)
(Continued)

(52) U.S. Cl.
CPC ............ *B01D 24/22* (2013.01); *B01D 24/24* (2013.01); *B01D 23/10* (2013.01); *B01D 23/12* (2013.01);
(Continued)

(58) Field of Classification Search
CPC ........ B01D 24/22; B01D 24/24; B01D 24/26; B01D 24/263; B01D 24/266; B01D 24/10;
(Continued)

(56) References Cited

U.S. PATENT DOCUMENTS 1,812,725 A * 6/1931 Stanley .................. B01D 29/39
140/109
3,968,038 A 7/1976 Nilsson
(Continued)

FOREIGN PATENT DOCUMENTS

EP 2877261 6/2015
SU 67735 A 12/1946
(Continued)

OTHER PUBLICATIONS

International Preliminary Report on Patentability for International Application No. PCT/US/2013/052369 dated Jan. 27, 2015.
(Continued)

*Primary Examiner* — Angel Olivera
(74) *Attorney, Agent, or Firm* — Patterson Thuente Pedersen, P.A.

(57) ABSTRACT

A support grid assembly for use in a vessel. The support grid assembly includes panels each including a first wall including a media-supporting screen and a second wall to be supported by the vessel wall inner surface. A manifold is coupled to the panels and is in hydraulic communication with vessel outlet. The manifold and the panels permit fluid to flow through the screen in each panel, through the panels, into the manifold, and through the manifold to the outlet of the vessel, as well as in the reverse direction. At least a portion of the first wall may slope downward toward the manifold, and at least a portion of the second wall may form a bottom surface that is curved to substantially conform to
(Continued)

a curvature of the vessel wall inner surface. The panels may be arranged in a circular configuration extending radially from the manifold.

21 Claims, 13 Drawing Sheets

(51) Int. Cl.
*B01D 24/02* (2006.01)
*B01D 24/00* (2006.01)
*B01D 24/24* (2006.01)
*B01D 24/22* (2006.01)
*B01J 8/00* (2006.01)
*B01D 24/20* (2006.01)
*B01D 24/10* (2006.01)
*C02F 1/00* (2006.01)

(52) U.S. Cl.
CPC .............. *B01D 23/18* (2013.01); *B01D 24/02* (2013.01); *B01D 24/10* (2013.01); *B01D 24/20* (2013.01); *B01D 39/12* (2013.01); *B01D 2201/04* (2013.01); *B01J 8/00* (2013.01); *C02F 1/001* (2013.01); *Y10T 29/49826* (2015.01)

(58) Field of Classification Search
CPC ........ B01D 24/20; B01D 23/12; B01D 23/18; B01D 2201/04; B01D 39/12; B01D 23/10; Y10T 29/49826; C02F 1/001
See application file for complete search history.

(56) References Cited

U.S. PATENT DOCUMENTS

| 4,126,559 | A | 11/1978 | Cooper |
| 5,015,383 | A | 5/1991 | Evans |
| 6,878,351 | B1* | 4/2005 | Davies ................ B01J 8/008 422/143 |
| 2002/0011428 | A1* | 1/2002 | Scheuerman ............ B01J 8/003 208/89 |
| 2002/0185427 | A1 | 12/2002 | Norell |
| 2004/0124590 | A1* | 7/2004 | Hight, Jr. ............... B21D 53/36 277/630 |

FOREIGN PATENT DOCUMENTS

| WO | WO 2011/088447 A3 | 7/2011 |
| WO | WO 2014/018911 | 1/2014 |
| WO | WO 2014/018911 A1 | 1/2014 |

OTHER PUBLICATIONS

U.S. Patent and Trademark Office, International Application No. PCT/US2013/052369 International Search Report and Written Opinion dated Dec. 6, 2013, pp. 1-11.
Office Action dated Feb. 14, 2017 for Australian Application No. 2013295528, 4 pages.
Office Action dated Jul. 12, 2017 for Russian Application No. 2015104870 9 pages.
European Communication Pursuant to Article 94(3) EPC, dated Aug. 10, 2018, 2 pages.
Canada Office Action for Application No. 2,880,111, dated May 3, 2019, 4 pages.
Australian Office Action for Australian Application No. 2018201031, dated Jul. 23, 2019, 5 pages.
Australian Office Action for Application No. 2018201031, dated Feb. 19, 2019, 4 pages.
Canadian Office Action for Canadian Application No. 2,880,111, dated Feb. 6, 2020, 3 pages.
India Office Action for India Application No. 362/KOKNP/2015, dated Apr. 3, 2020, 6 pages.

\* cited by examiner

ENHANCED SHAPE SUPPORT GRID

CROSS-REFERENCE TO RELATED APPLICATIONS

This application claims the benefit of U.S. Patent Application No. 61/676,156, filed Jul. 26, 2012 and U.S. Patent Application No. 61/809,091, filed Apr. 5, 2013, the contents of both of which are incorporated herein by reference in their entirety.

FIELD

Embodiments disclosed herein generally relate to a support grid for use in a vessel containing a media bed, which may include a filtering surface supporting the media bed and be supported by an inner surface of the vessel.

BACKGROUND

In some petrochemical and general industry applications, internal screens are needed in process pressure vessels for the purposes of filtering and supporting filter media. For some of these applications, however, the process induces large loads on the internal screen surfaces and generates extreme swings in temperature ranges that cause thermal expansion. Traditional flat surface grid assemblies may be located near the tangent line of the head to shell weld. With such designs, the entire volume of the head may be a dead area, with no reaction or drying adsorption occurring. Further, the typical flat grid's design may require support beams to carry the weight of the bed and the process pressure differential.

With respect to the utilization of a media bed in the vessel, in some traditional installations, during down flow in a vessel a central outlet may be used and may cause flow to move sideways as it reaches lower elevations of the bed. Flow rates can vary within only a single level of the bed, causing poorly utilized catalyst and potential early breakthrough of the sieve. In an up flow case, an outlet basket covering the nozzle may create poor distributed flow. The implications for bed regeneration can be quite severe, and may have the potential for early breakthrough and effective loss of bed height.

In designing vessels, it is often desirable to provide the end user with a maximum vessel volume, to effectively resist the expected process loads, and to provide a good distribution pattern for flows moving through the vessel.

SUMMARY

In accordance with one embodiment disclosed herein, a support grid assembly for use in a vessel including a wall with an inner surface is provided. The support grid assembly includes at least one panel including a first wall including a screen configured to support a media, and a second wall configured to be supported by the inner surface of the wall of the vessel. A manifold is coupled to and in hydraulic communication with the at least one panel and configured to be in hydraulic communication with an inlet or outlet of the vessel, depending on the mode of operation. In some such embodiments, at least a portion of the first wall of the at least one panel is configured to slope downward toward the manifold when installed in the vessel, at least a portion of the second wall of the at least one panel forms a bottom surface that is curved to substantially conform to a curvature of the inner surface of the wall of the vessel, or a combination thereof. In some such embodiments and in combination with any of the above embodiments, the at least one panel includes a plurality of panels coupled to and in hydraulic communication with the manifold.

In some embodiments and in combination with any of the above embodiments, wherein the manifold and the plurality of panels are configured to permit fluid to flow in a first direction through openings in the screen, through the at least one panel, into the manifold, and through the manifold directed to the outlet of the vessel, in a second, reverse direction, or in both directions. In some embodiments and in combination with any of the above embodiments, each panel is in hydraulic communication with the manifold via a tubular connection.

In some embodiments and in combination with any of the above embodiments, the manifold includes an outlet that directs flow to the outlet of the vessel, and the tubular connection and manifold outlet are configured such that fluid flows through the tubular connection in a direction opposite fluid flow through the manifold outlet. In some embodiments and in combination with any of the above embodiments, the manifold outlet is configured to direct flow downward. In some embodiments and in combination with any of the above embodiments, the manifold has an upper end and a top screen is mounted to the upper end of the manifold.

In some embodiments and in combination with any of the above embodiments, the manifold includes an outlet that directs flow to the outlet of the vessel, and the tubular connection and manifold outlet are configured such that fluid flows through the tubular connection in the same direction as fluid flow through the manifold outlet. In some embodiments and in combination with any of the above embodiments, the manifold outlet is configured to direct flow upward.

In some embodiments and in combination with any of the above embodiments, the tubular connection from each panel to the manifold is made through a bottom surface of the manifold, top surface of the manifold, side surface of the manifold, or any combination thereof.

In some embodiments and in combination with any of the above embodiments, the tubular connection is at a connection interface, and comprises a bellows element or a joint that allows expansion and contraction of components around the connection interface.

In some embodiments and in combination with any of the above embodiments, the manifold comprises flow control vanes or other flow control mechanisms. In some embodiments and in combination with any of the above embodiments, each panel defines a volume, and within the volume are flow control vanes or other flow control mechanisms. In some such embodiments, the flow control vanes comprise supports for the screen of each panel.

In some embodiments and in combination with any of the above embodiments, the panels are arranged in a circular configuration extending radially from the manifold, and the panels have a proximal end near the manifold and an opposite, wider distal end. In some embodiments and in combination with any of the above embodiments, the second wall of at least one panel includes a screen, and in some embodiments and in combination with any of the above embodiments, all walls of at least one panel include a screen.

In some embodiments and in combination with any of the above embodiments, the support grid assembly includes a layer of compressible material configured to be interposed between the bottom surface of the panels and the inner surface of the vessel. When the support grid assembly is installed in the vessel, the bottom surface of the panels engages the layer of compressible material and the layer of compressible material engages the inner surface of the vessel. In some such embodiments, the layer of compressible material comprises a thermal gasket. In other such embodiments, the layer of compressible material comprises textured fiberglass yarn.

In some embodiments and in combination with any of the above embodiments, the support grid assembly includes a bellows element or a joint that allows expansion and contraction hydraulically interposed between the manifold and the inlet or outlet of the vessel.

In some embodiments and in combination with any of the above embodiments, each panel includes a side extending substantially radially from proximate to the manifold, and a swing arm is pivotally mounted to a side of at least two adjacent panels for attaching to a swing arm of the adjacent panel. In some such embodiments, a support bar is mounted to the side of each panel, and the swing arm is mounted to the side of each adjacent panel by being pivotally mounted to the support bar. In some embodiments and in combination with any of the above embodiments, wherein each panel includes a side extending substantially radially from proximate to the manifold and a support bar is mounted to the side of each panel.

In some embodiments and in combination with any of the above embodiments, the support grid assembly includes a rod mounted to the manifold and a support member defining a channel and hook portion mounted to the panel, wherein the rod is received in the channel and hook portion to couple the panel to the manifold.

In accordance with another embodiment disclosed herein, another support grid assembly for use in a vessel including a wall with a curved inner surface is provided. The support grid assembly includes means for supporting a filter media in the vessel and means for receiving filtered process fluid from the means for supporting the filter media. The means for supporting the filter media includes a curved surface configured to conform to and be proximate to the curvature of the inner surface of the wall of the vessel proximate to a lower end of the vessel. In some such embodiments, the means for receiving filtered process fluid defines a plurality of openings for receiving filtered process fluid from a plurality of means for supporting the filter media.

In accordance with another embodiment disclosed herein, a method of making a support grid assembly for a vessel is provided. The method includes fabricating a plurality of panels, each panel including a first wall including a screen configured to support a media, and a second wall configured to be supported by an inner surface of the wall of the vessel proximate to a lower end of the vessel. At least a portion of the second wall of each of the plurality of panels forms a bottom surface that is curved to substantially match a curvature of the inner surface of the wall of the vessel. A manifold is fabricated that defines a plurality of openings for receiving the plurality of panels to place the manifold and the panel in hydraulic communication. The plurality of panels is coupled to the manifold to place the plurality of panels in hydraulic communication with the manifold. In some such embodiments, when coupled, the manifold and the plurality of panels are configured to permit fluid to flow in a first direction through openings in the screen, through the at least one panel, into the manifold, and through the manifold directed to an outlet of the vessel, in a second, reverse direction, or in both directions. In some such embodiments, the method includes placing a layer of compressible material on the inner surface of the wall of the vessel prior to assembling the plurality of panels to the manifold, with the layer of compressible material configured to be between the panels and the inner surface of the wall of the vessel.

BRIEF DESCRIPTION OF THE DRAWINGS

For a more complete understanding, reference should now be had to the embodiments shown in the accompanying drawings and described below. In the drawings.

DETAILED DESCRIPTION

The following detailed description of embodiments refers to the accompanying drawings, which illustrate specific embodiments. Other embodiments having different structures and operation do not depart from the scope of the present disclosure.

Embodiments disclosed herein include a support grid assembly that may be used within tanks or vessels to support media beds through which fluids are directed. Such media beds may be used in a variety of processes, including but not limited to catalytic, molecular sieves, alumina drying, resin ion exchange, carbon filtering, etc. Various fluids, including but not limited to liquid, gas, oil, water, etc., may be processed through the vessel. The vessel may be oriented vertically, horizontally, or in other orientations and configurations known in the art. The vessel may generally comprise a body and head portions coupled at opposite ends of the body to form a sealed interior vessel volume. The support grid assembly may be disposed along and utilize the inner surface of the vessel head for structural support, as well as to maximize the interior vessel volume for use by additional media and other interior components.

The support grid assembly may include a plurality of panels having a filtering surface formed by one or more screens on the top, side, bottom, or other exposed surface of the panels, and a manifold coupled to the panels. The panels may be, in some embodiments, radially disposed about the manifold. The screens may support a media bed, and in certain modes such a down flow, fluid may flow through the media bed and the screens into the panels. Fluid may then flow into the manifold and out of the vessel. Fluid may also flow directly into the manifold through a screen or perforated plate portion that forms a top of the manifold. Alternatively, the direction of flow may be reversed, such as in certain modes of up flow, and flow into the manifold may be distributed to the panels, with flow then passing out of the panels, through the screens, and into the vessel. Flow through the assembly in either an up flow or down flow condition can be compressible (gas) or incompressible (liquid).

Certain terminology is used herein for convenience only and is not to be taken as a limitation on the embodiments described. For example, words such as "top", "bottom", "upper," "lower," "left," "right," "horizontal," "vertical," "upward," and "downward" merely describe the configuration shown in the figures. Indeed, the referenced components may be oriented in any direction and the terminology, therefore, should be understood as encompassing such variations unless specified otherwise. Throughout this disclosure, where a process or method is shown or described, the method may be performed in any order or simultaneously, unless it is clear from the context that the method depends on certain actions being performed first.

Figure 1:
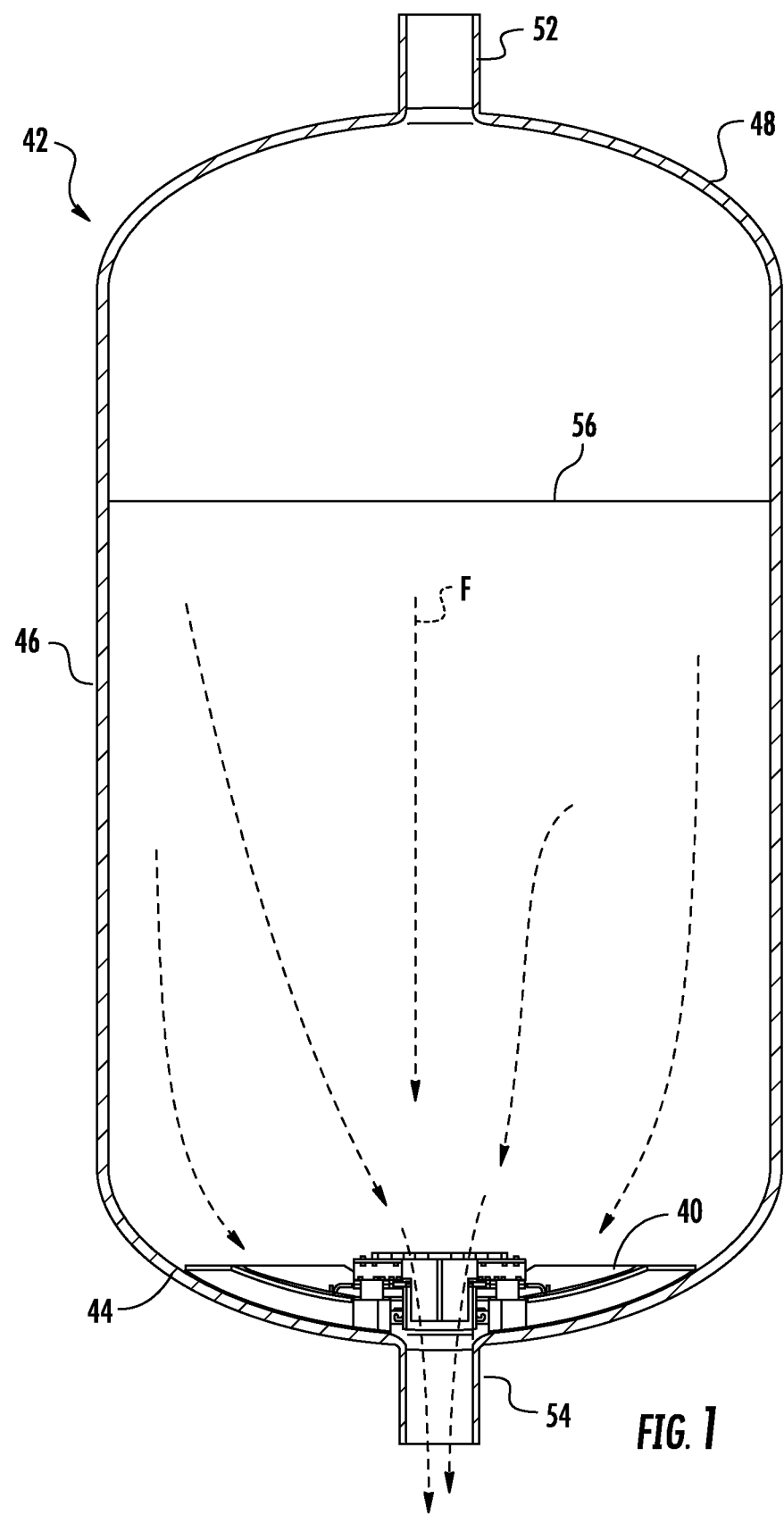
FIG. 1 is a schematic cross-section view of a vessel in which an embodiment of a support grid assembly is disposed.
Figure 2:
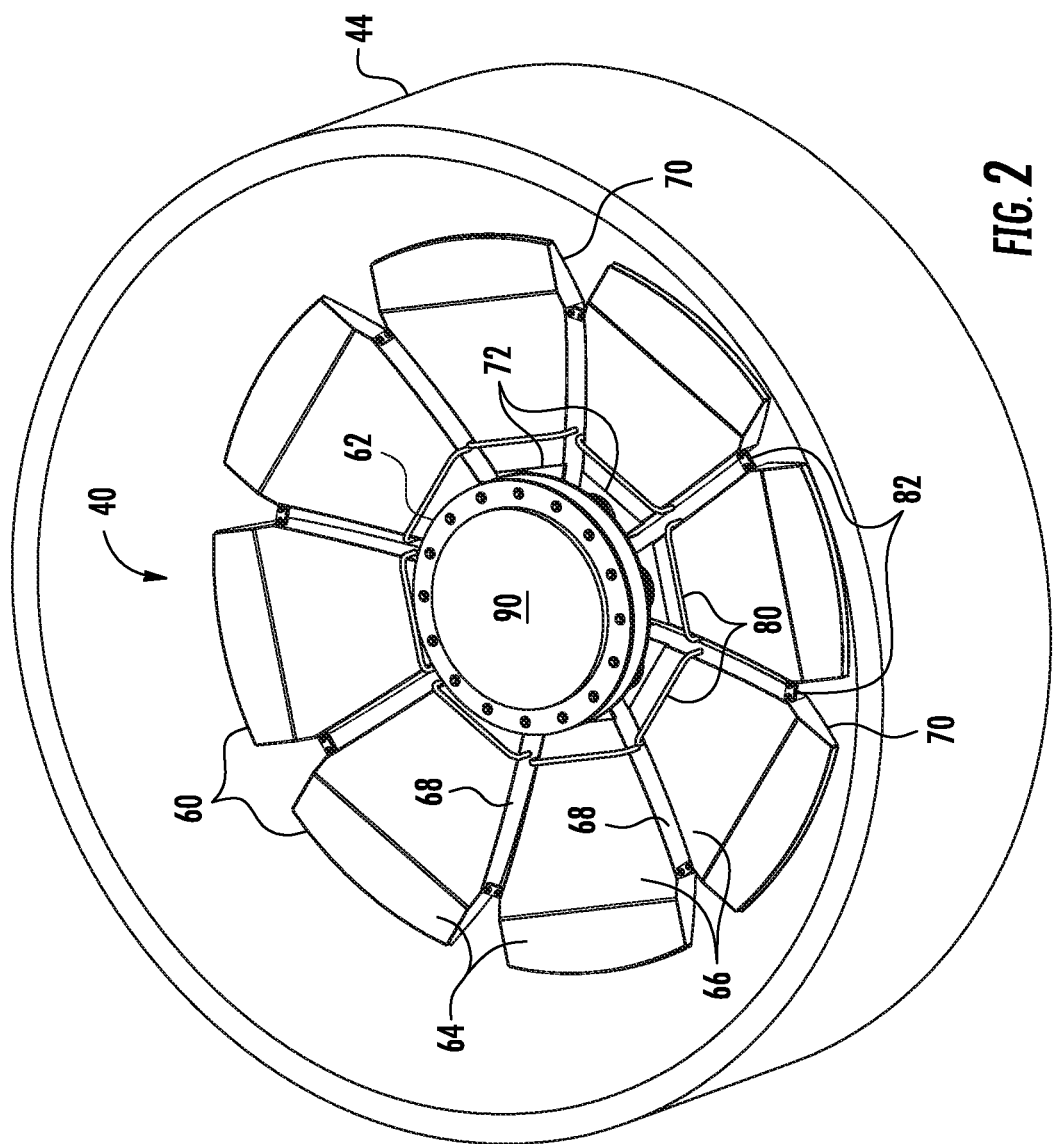
FIG. 2 is a perspective view of an embodiment of a support grid assembly disposed in a vessel head according to one embodiment.
Figure 4:
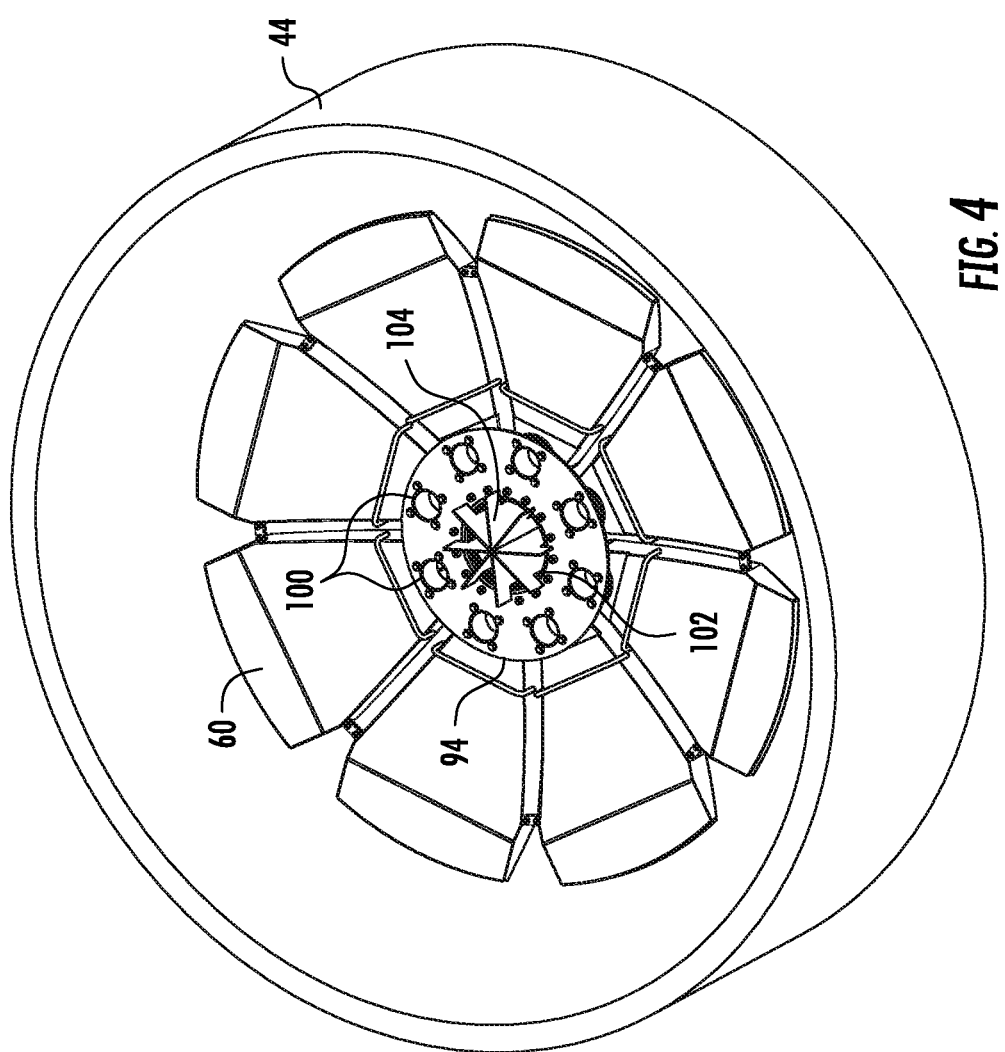

Referring to the drawings, where like reference numerals refer to the same or similar parts, FIG. 1 shows a support grid assembly 40 in a vessel 42 according to one embodiment. The support grid assembly 40 may be concentrically disposed in a lower vessel head 44 of the cylindrical vessel 42. The vessel 42 may also include, for example, a vessel body 46, interior vessel components (not shown), the opposite vessel head 48, an inlet 52, and an outlet 54. A fluid surface 56 is shown with flow "F", which in certain modes of operation could be in the opposite direction. Filter media is not shown. One example of a vessel that can be used with the embodiments described herein is illustrated in FIG. 4 of U.S. Pat. No. 5,015,383, the contents of which are herein incorporated by reference in their entirety.

The support grid assembly 40 includes one or more grid panels 60 coupled to a center manifold 62. FIG. 1 illustrates eight panels 60, although any number of panels may be used, with the panels 60 radially disposed around the manifold 62. The panels 60 may be coupled to the manifold 62 using a pipe-based interface with flange or socket type connections that form a seal between the panels 60 and the manifold 62. Other types of interfaces and connections known in the art may be used with the embodiments described herein.

The panels 60 may rest against the inner wall of the vessel head 44 for structural support. The panels 60 may be formed from walls with, for example, a first wall that includes one or more sections of screens 64, 66 that are supported by one or more other walls 68, 70, 72. The walls 68, 70, 72 are secured together to form a sealed enclosure, which may be considered to be, for example, a housing. The bottom surface of the panel 60 (or second wall 70) may be supported by and curved to conform to or approximately match the curvature of the curved inner surface of the wall of the vessel head 44. At least a portion of the first wall, such as screen 66, may slope downward toward the manifold 62. This may increase the volume in the vessel 42 available for fluid. Any panel surface, including any walls 68, 70, 72, may include one or more screens. In one embodiment, the bottom surface of one or more panels 60 (second wall 70) includes a screen. In another embodiment, all walls of one or more panels 60 include screens.

The panels 60 may also rest against a gasket or other intermediate compressible layer surface between the panels 60 and the vessel wall. This additional gasket or layer is intended to fill any gap and excessive spaces between the panel and the vessel wall or shell. Although the screens 64, 66 and walls 68, 70, 72 are illustrated as generally rectangular or trapezoidal in shape, other configurations, shapes, or number of screen sections may be used with the embodiments described herein. For example, the nose of the panel 60 may be curved and, in some embodiments, formed from pipe and the end of the panel may be formed from a small strip of material. Each panel 60 may include a support bar 80 for support or handling purposes. In the embodiment shown, each panel 60 is also connected to an adjacent panel 60 by a rigid connection 82, such as a plate and bolt connection, for support, handling, or load distribution purposes. Other types of spacing, shimming, or gap compensating methods known in the art can also be applied to the embodiments disclosed herein.

Media, such as catalyst, may be supported on the panels 60. In particular, the media may be disposed on the upper surfaces of the screens 64, 66. Fluid may flow through the media, through the screens 64, 66 into the manifold 62, and out of the vessel 42. The screens 64, 66 are configured to permit fluid flow but prevent the media from flowing out of the vessel 42.

In one embodiment, the screens 64, 66 of the upper surface of the panels 60, the screens included in any other wall 68, 70, 72, or screens for any embodiment disclosed herein may include a plurality of spaced filter wires supported on support rods. In one embodiment, such screens may include wire with a substantially triangular cross-section, and may include Vee-Wire® type screens (VEE-WIRE is a registered trademark of Bilfinger Water Technologies Inc.) or wedge wire type screens. In one embodiment, such screens may include plates having perforations, slots, and/or other filter-type openings. In one embodiment, the wires and plate openings may be oriented symmetrically, asymmetrically, horizontally, vertically, tangentially, and combinations thereof relative to the longitudinal axis of the panel 60. In one embodiment, the spacing and sizes of wires and plate openings vary along the lengths of such screens. In one embodiment, such screens may include one or any combination of filter wires, plates, features with perforations, features that otherwise provide a plurality of filter-type openings, and flow control vanes. Such screens may include the embodiments like those disclosed in U.S. Pat. No. 6,663,774, filed on Oct. 16, 2001 and specifically with respect to the filter wires 28 and the support rods 20 described therein, and embodiments like those disclosed in U.S. Pat. No. 7,425,264, filed on Jul. 18, 2005 and specifically with respect to the wires 16 and the support rods 17 described therein, the contents of both of which patents are herein incorporated by reference in their entirety.

The manifold 62 may include a top screen 90 at the upper end of the manifold 62, and the top screen 90 may include the same features as the screens 64, 66 described above. Media may be supported on the upper surface of the screen 90. Alternatively, the top screen 90 could be a perforated plate or a member that has other openings that allow fluid through while supporting media. Fluid may flow through the media, through the openings in the top screen 90 and past the top screen 90, and directly into the manifold 62. In one embodiment, the top screen 90 may include a screen portion disposed above a perforated plate portion, with one or more flow control vanes disposed between the screen and plate portions. The manifold 62 may be coupled to an in hydraulic communication with an outlet 54 of the vessel 40. In other words, the interior volume defined by the panels 60 may be in hydraulic communication with the interior volume of the manifold 62, which may be in hydraulic communication with the vessel outlet 54.

Figure 3:
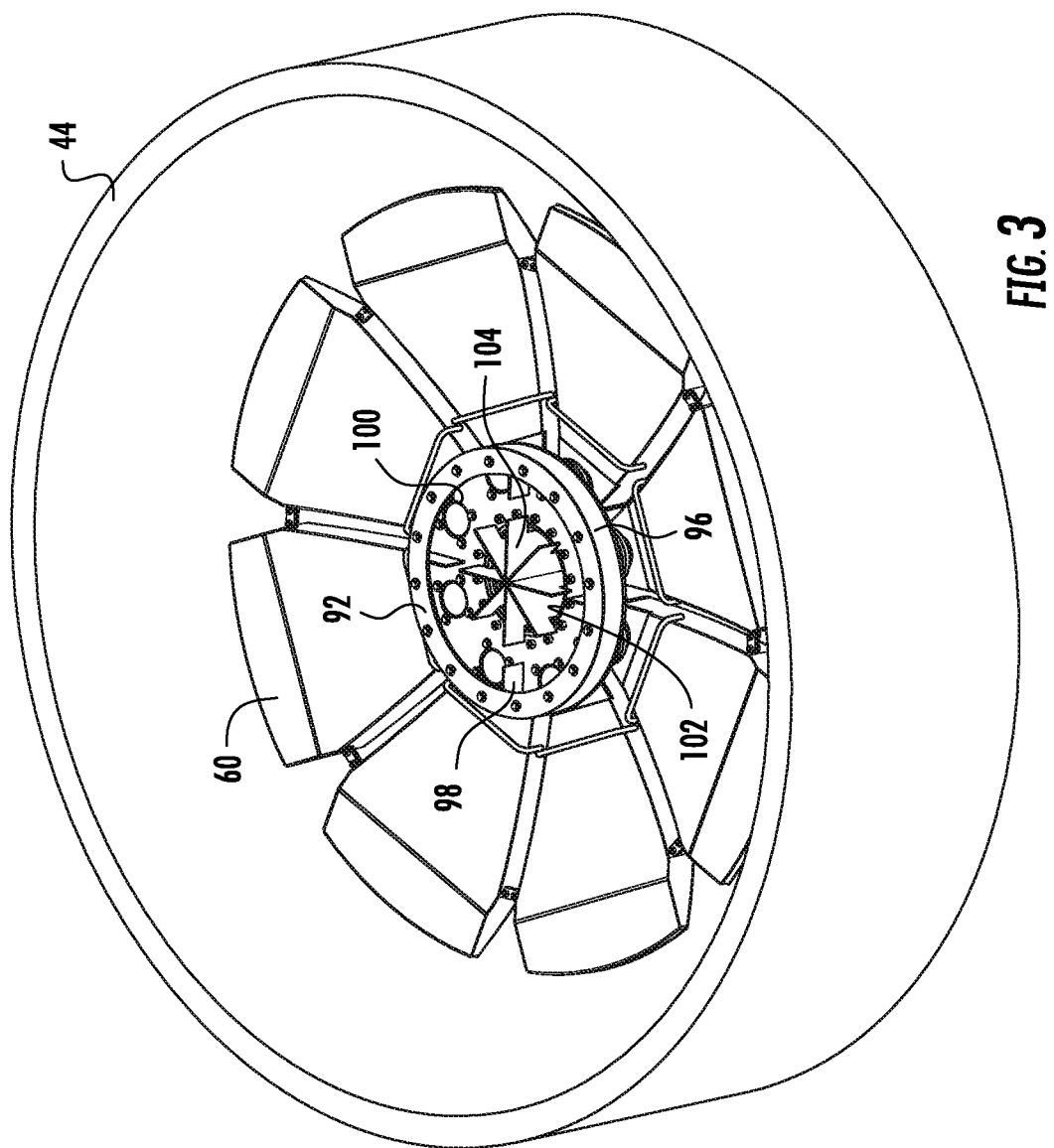
FIGS. 3 and 4 are perspective views of portions of the support grid assembly of FIG. 2 in the vessel head illustrating the interior of a manifold assembly.

FIGS. 3 and 4 illustrate the interior of the manifold 62. The manifold 62 may include upper and lower flanges 92, 94 and a body 96 and one or more flow control vanes 98 disposed between the flanges 92, 94. The upper flange 92 may be used to support the top screen 90. The lower flange 94 may be used to couple the manifold 62 to the panels 60 via one or more tubular connections, such as pipes 100 as further described below, to place the panels 60 and manifold 62 in hydraulic communication. The lower flange 94 may also be coupled to a manifold outlet 102, such as a flanged pipe, which couples the manifold 62 to the vessel head 44 and which is in fluid communication with the vessel outlet 54 (illustrated in FIGS. 5A and 5B). One or more flow control vanes 104 may be supported by the top screen 90, and in particular may be coupled to the bottom surface of the top screen 90. The flow control vanes 104 may be disposed radially within the manifold 62, and may extend at least partially into the manifold outlet 102. In addition to or in place of flow control vanes, other flow control mechanisms may be provided as known to one of ordinary skill in the art for directional or flow characteristic management, or in general to divert or restrict flow, of the fluid. Examples of other flow control mechanisms include tubes, perforated plates, and cones.

Figure 5A:
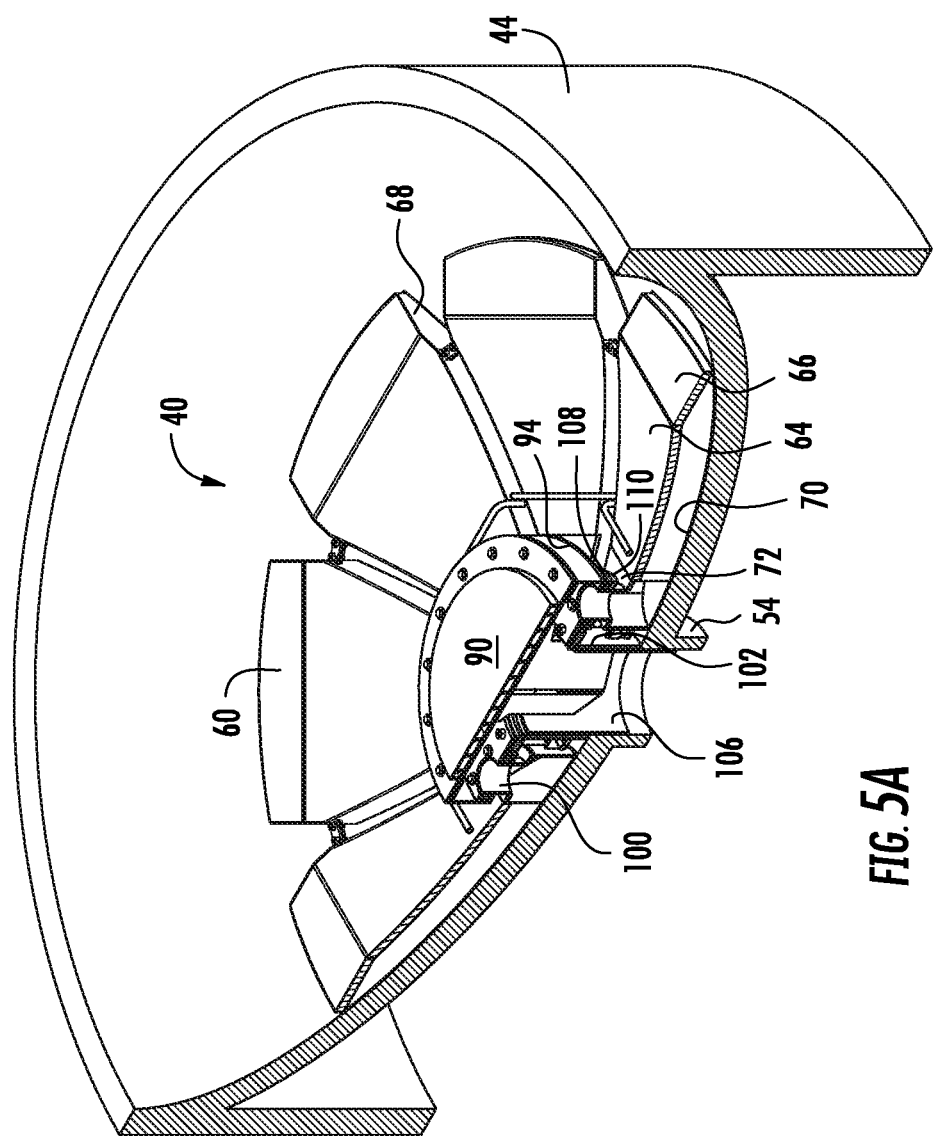
FIGS. 5A and 5B are perspective and elevation cross-sectional views, respectively, of the support grid assembly of FIG. 2 in the vessel head.
Figure 5B:
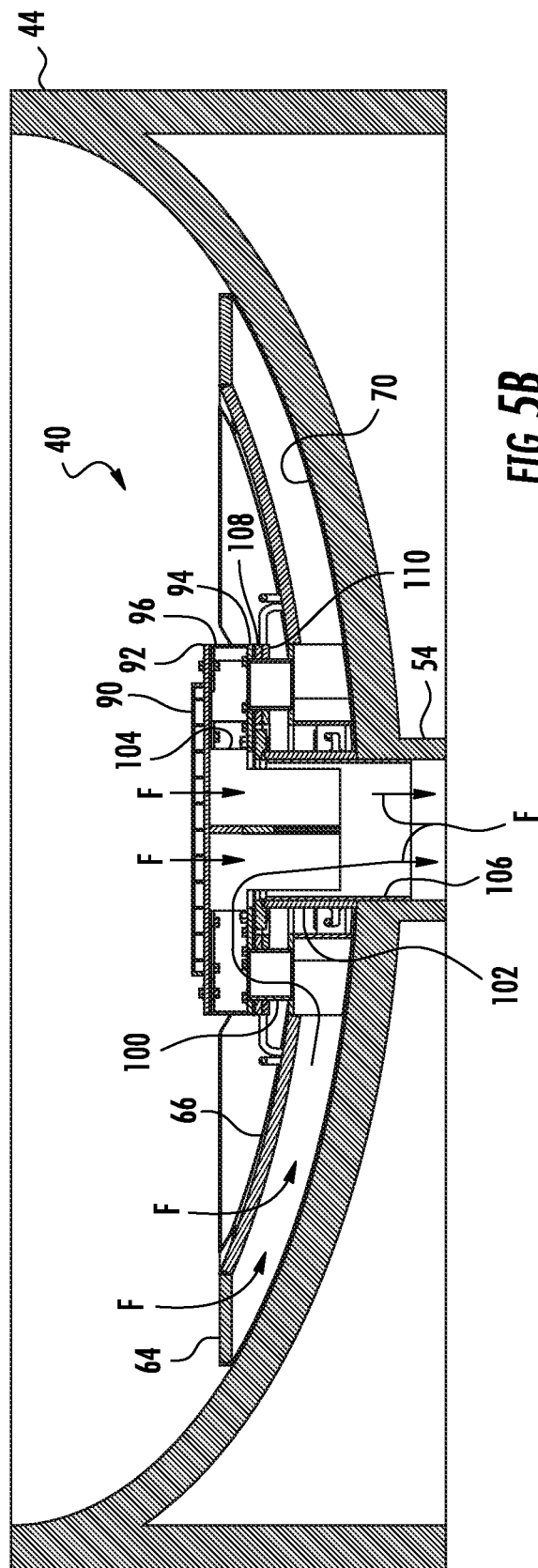

FIGS. 5A and 5B illustrate sectional views of the support grid assembly 40. The flanged portion of the manifold outlet 102 is shown bolted to the lower flange 94 of the manifold 62. The manifold outlet 102 may be welded to the vessel 44, such that it is in fluid communication with the vessel outlet 54. An extension pipe 106 may also be used to form the connection between the manifold 62 and the vessel outlet 54. The extension pipe 106 is shown disposed at least partially in the manifold outlet 102 and extending into the vessel outlet 54. In one embodiment, the extension pipe 106 (or another pipe portion coupled to the extension pipe 106) may extend through and radially outward below the vessel outlet 54 such that a flanged section of the extension pipe 106 is used to connect the entire vessel assembly to any other structural type of outlet/inlet connection. Bolting, welding, clamping, and other similar types of structural or sealed connections known in the art may be used with the embodiments described herein.

The lower flange 94 of the manifold 62 is shown coupled to pipes 100 to establish fluid communication with each of the panels 60 through a bottom surface of the manifold 62. Each pipe 100 may be supported by an end portion of each panel 60, by, for example, being welded to the end portion, such as wall 72 to couple the panel 60 the manifold 62. Each pipe 100 may include a pipe flange 108 or other similar type of shoulder portion, which is secured between the lower flange 94 and a split ring 110 having two or more pieces brought together around the pipe 100 (also illustrated in FIGS. 6A and 6B). In particular, one or more bolts may extend through the lower flange 94, the pipe flange 108, and the split ring 110 to secure each panel 60 to the manifold 62. The end portions of the panels 60 may be disposed below the main portion of the manifold 62, and may be coupled to a bottom surface, such as the lower flange 94, of the manifold 62. In one embodiment, a seal, such as a gasket, may be disposed between the lower flange 94 of the manifold 62 and the pipe flange 108 of each pipe 100. In this manner, each panel 60 may be easily connected to and removed from the manifold 62 using a simple, structurally rigid and sealed connection. The tubular connections or pipes 100 may take a variety of forms as are known in the art. For example, the tubular connections could instead be fittings, such as 90 degree, 180 degree, or other angle bends, or another type of duct connection.

Referring to FIG. 5B, one or more flow arrows "F" are illustrated to show the fluid flow paths through the support grid assembly 40. A fluid directed to the support grid assembly 40 may first flow through any media disposed on the screens 64, 66, 90. As stated above, the screens 64, 66, 90 may be configured to permit fluid flow but prevent the media from flowing through the screens 64, 66, 90. Fluid may flow through screens 64, 66 into the interior of the panels 60, and may be directed along the bottom wall 70 to the pipes 100. Screens can incorporate perforations or other restrictions to control the amount of fluid that passes through each surface relative to the other screen surfaces. The fluid may then flow in an upward direction into the manifold 62, for example, through the pipes 100 in a direction parallel to the longitudinal axis of the vessel 42 and manifold 62 and opposite the direction of flow into the vessel 42 and fluid flow out of the vessel outlet 54. Fluid may also flow directly into the manifold 62 via the top screen 90. The fluid may finally flow out of the manifold outlet 102 (and extension pipe 106) in a downward direction, parallel to the longitudinal axis of the vessel and manifold 62 and out through the vessel outlet 54 in the same direction of the general flow through vessel 42. The flow control vanes 98, 104 or other flow control mechanisms disposed in the manifold 62 may help direct the fluid flow and control the fluid flow distribution through the support grid assembly 40. Any number or arrangement of flow control vanes 98, 104 may be used to optimize fluid flow direction and distribution through the support grid assembly 40. Flow can also move in the reverse direction if required by the application process, in which case, for example, flow into the manifold 62 from an inlet (previously outlet 54) may be distributed to the panels 60 and flow through the screens 64, 66 in to the vessel 42.

Figure 6A:
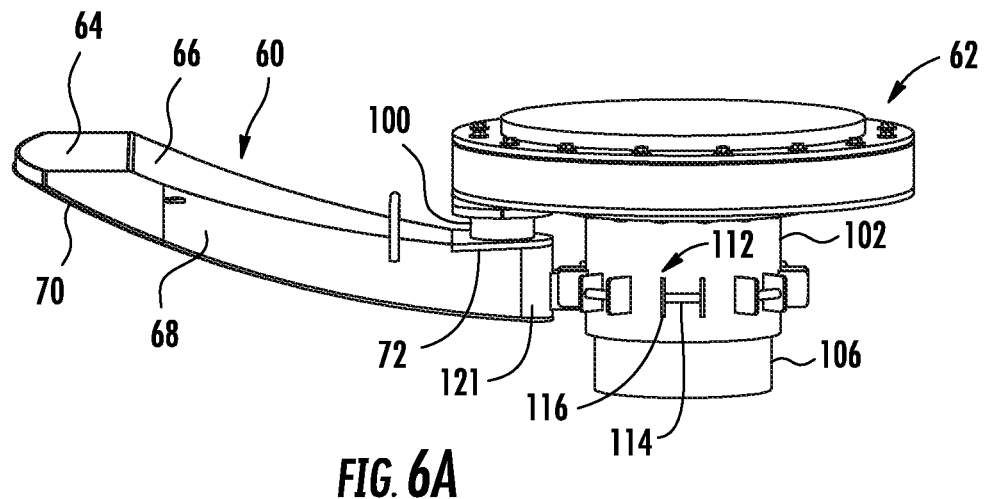
FIGS. 6A and 6B are perspective and partially exposed perspective views of a portion of the support grid assembly of FIG. 2, respectively.
Figure 6B:
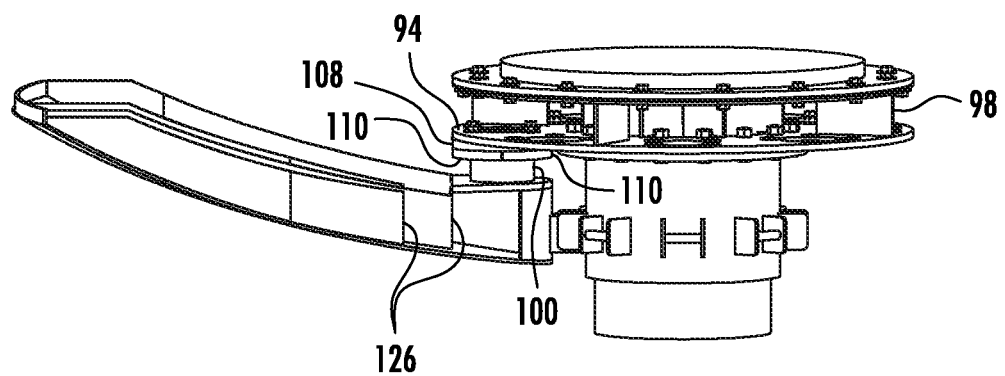

FIGS. 6A and 6B illustrate one panel 60 connected to the manifold 62. Each panel 60 may be connected to the manifold 62 by a locking connection 112 disposed on the outer surface of the manifold outlet 102. In particular, the locking connection 112 may include one or more rods 114 welded by support members 116 to the manifold outlet 102. Each panel 60 includes one or more mating connections 118 or hangers (illustrated in FIG. 7) for engagement with the locking connections 112. In particular, the mating connections 118 may include one or more support members 120 welded to the walls 68 of the panels 60 at the nose or end portion 121, the support members 120 each having a channel and hook portion 122 for receiving the locking connections 112. The support members 120 of the mating connections 118 may be substantially parallel to the support members 116 of the locking connections 112, which may be substantially perpendicular to the rods 114. In this manner, the panels 60 may be easily secured to and removed from connection with the manifold 62. Other types of connections known in the art may be used with the embodiments described herein.

Figure 7:
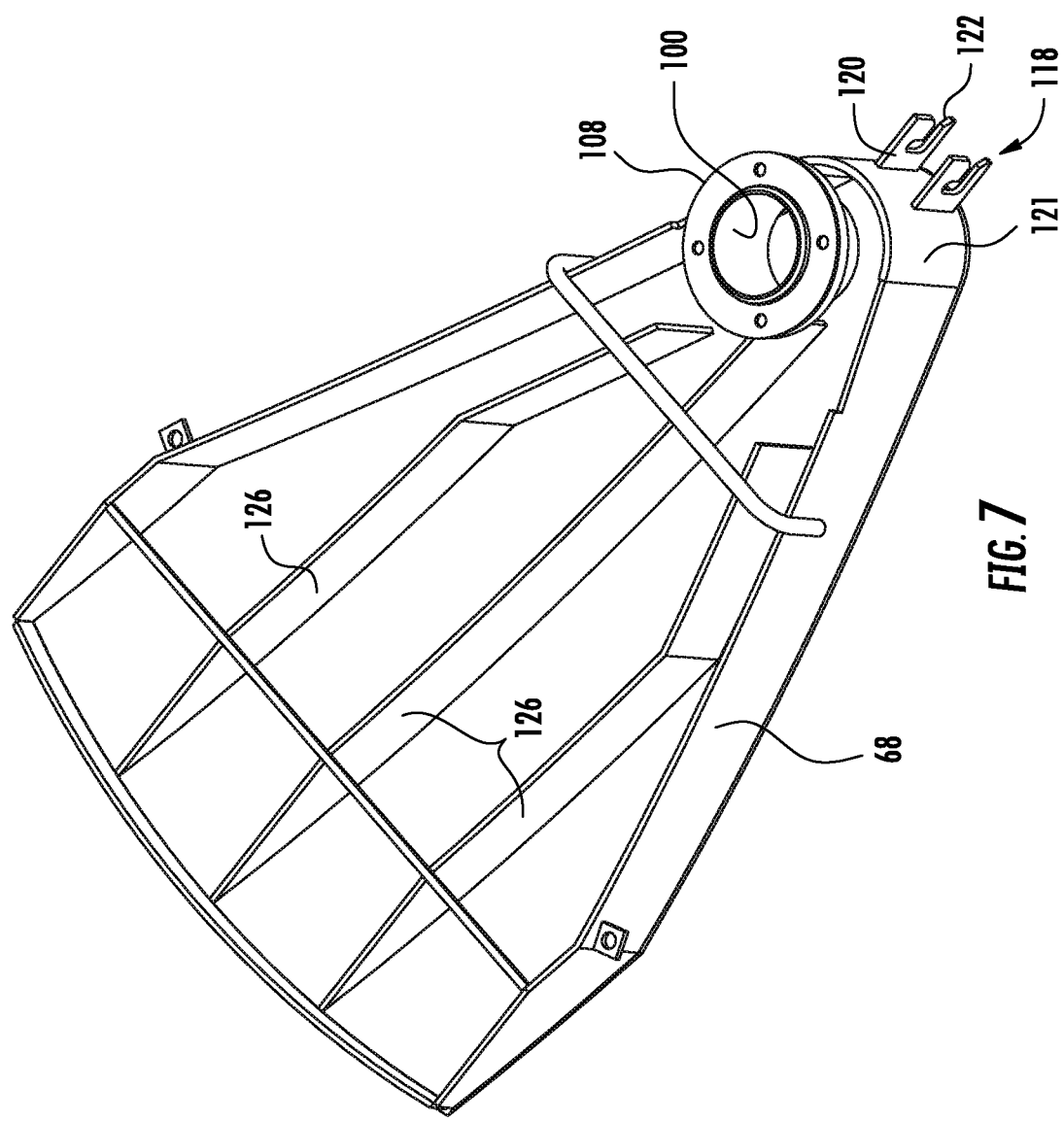
FIG. 7 is a perspective view of a portion of the support grid assembly of FIG. 2.

FIG. 7 illustrates the interior of one panel 60. As illustrated, one or more flow control vanes 126 may also be disposed in each panel 60 to direct fluid flow and control fluid flow distribution through each panel 60 and into the manifold 62. The flow control vanes 126 may be generally parallel to the longitudinal axis of each panel 60, but include tapered ends that direct fluid flow toward the pipes 100. Any number of flow control vanes 126 may be used to maximize fluid flow direction and distribution through the support grid assembly 40. Tabs or other restrictions can be added to the control vanes 126 to further control or manipulate the flow characteristics inside the panel 60. As noted with respect to the flow control vanes 104 of the manifold 62, other flow control mechanisms known in the art, such as tubes, perforated plates, and cones, can also be applied to balance the flow distribution in the embodiments disclosed herein.

Figure 8:
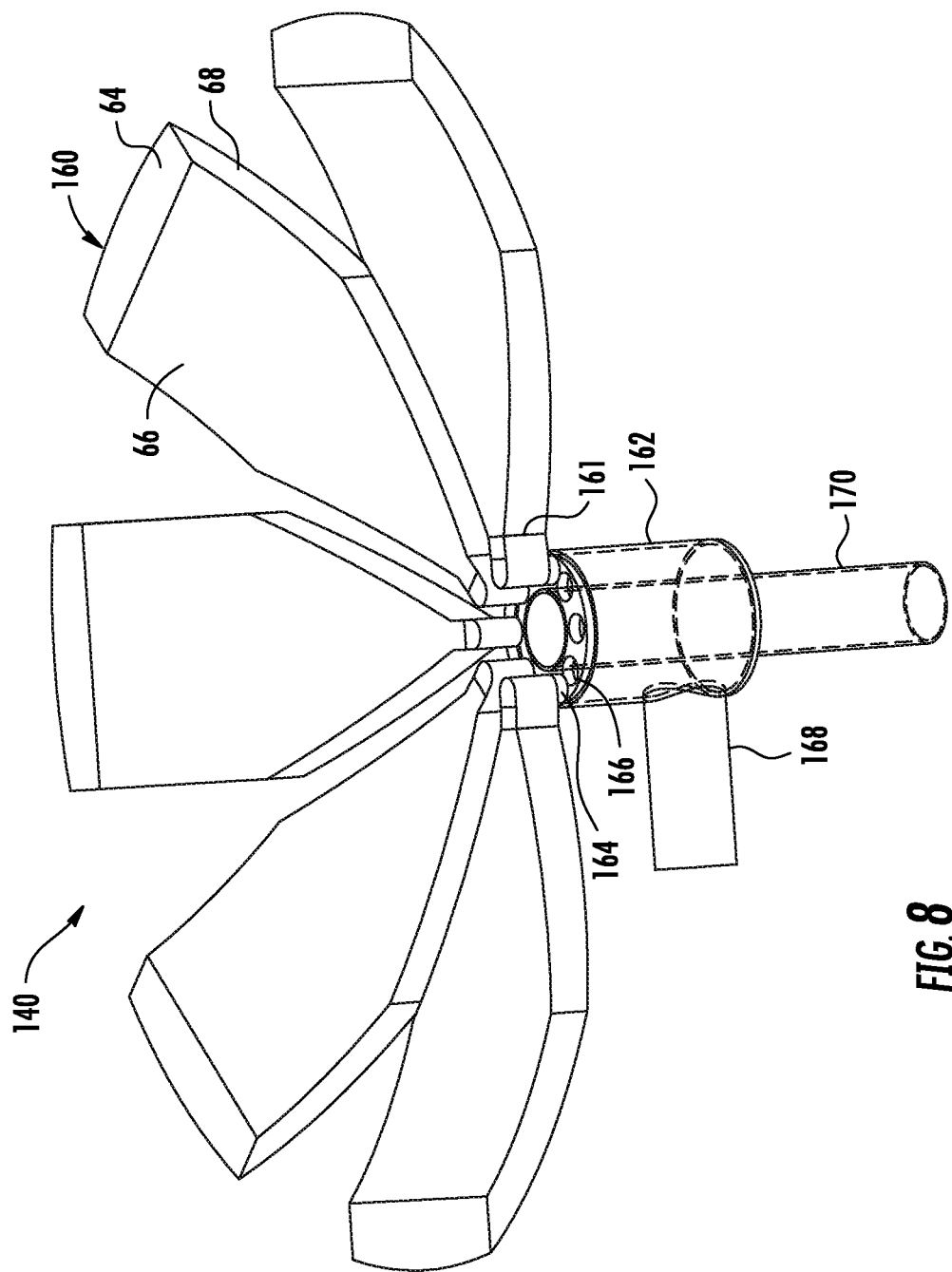
FIG. 8 is a perspective view of a portion of a support grid assembly according to another embodiment.

FIG. 8 illustrates another embodiment of a support grid assembly 140 having panels 160. The assembly 140 is similar to the assembly 40 described above, but the panels 160 have end portions 161 that direct fluid flow down into a manifold 162 via pipes 164 disposed below the panels 160. The pipes 164 may be connected to an upper flange 166 of the manifold 162 through a top surface of the manifold 162. An outlet pipe 168 may also be coupled to the manifold 168 for fluid flow out of the vessel assembly. An interior pipe 170 may be disposed through the manifold 162 and may be in fluid communication with the interior of the vessel assembly. Such a connection may be used, for example, where there are small or concentric outlets. The interior pipe 170 may be covered with a screen, similar to top screen 90, and may be utilized for backwashing processes to clean out used media, or to meet other similar process requirements, from the vessel assembly. The embodiments of the support grid assembly 40 of FIGS. 2-7, including the panels 60, may be used with the embodiments of the support grid assembly 140 of FIG. 8, and vice versa.

Figure 9:
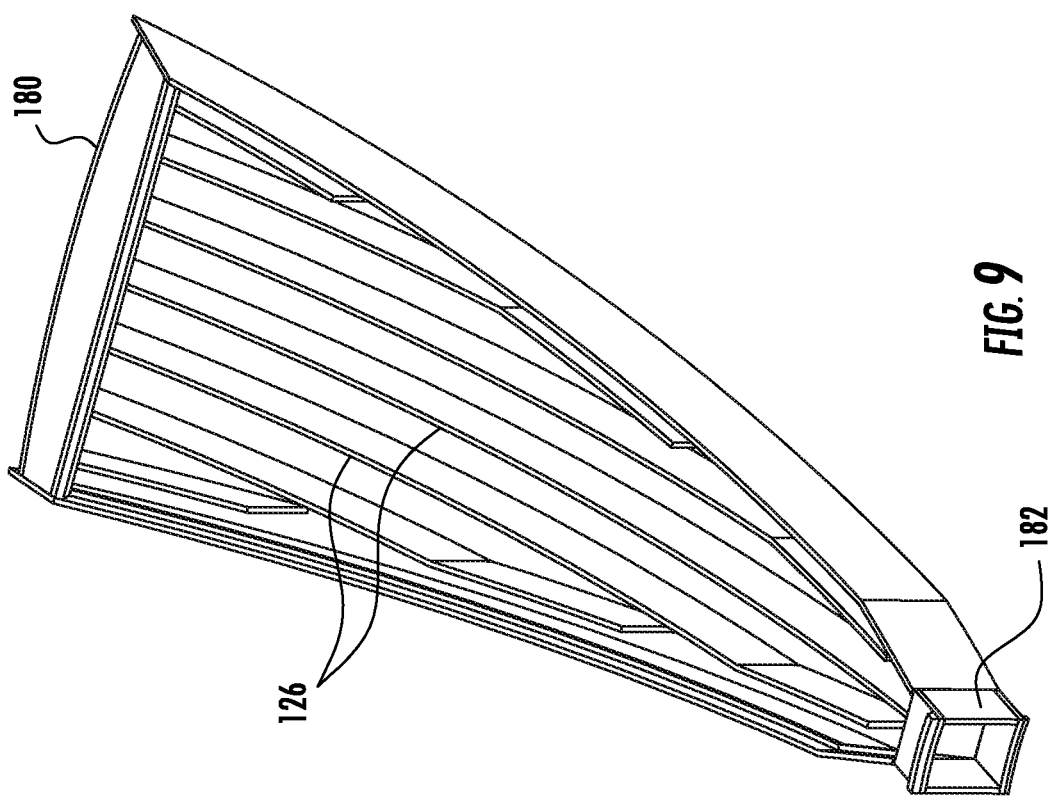
FIG. 9 is a perspective view of a portion of a support grid assembly according to another embodiment.

FIG. 9 shows an embodiment of a panel 180 defining a volume having one or more flow control vanes 126. The panel 180 is similar to the panels 60 described above, but includes an end portion 182 that may be coupled directly to the body of the manifold 62, for example, at a side surface of the manifold 62, or to the manifold outlet 102. In this embodiment, the opening of the end portion 182 is square, but other shapes may be used. The number of flow control vanes 126, which may also function as supports, may be varied depending on the load that will be experienced or desired flow characteristics and direction. A load that is expected to be relatively heavy may result in more flow control vanes 126 or supports being placed in the panel 180. The number of flow control vanes 126 may decrease for smaller loads. The embodiments of the panel 180 illustrated in FIG. 9 may be used with the embodiments of the support grid assemblies 40, 140 described above, and vice versa. One or more combinations of the various panel 60, 160, 180 connections, including the pipes 100 and end portions 161, 182, may be used with the embodiments described herein.

In one method of installing the support grid assembly 40, the manifold outlet 102, which may be considered a center outlet sleeve, may first be attached to the vessel outlet 54 (sometimes referred to as a nozzle). The manifold outlet 102 may be welded directly to the top forged area of the nozzle, or welded inside the nozzle diameter with some depth of insertion. An alternative not requiring welding to the nozzle is to use a trapped flange at the first exterior joint to the vessel. A jig may be provided for proper extension of the center hub into the vessel. Mating connections 118 or hangers are provided to position the nose section of each panel 60 and will assist in the final sealing operation. After all pieces are placed inside the vessel and seated, a gasket (not shown) may be used on each pipe flange 108. The lower flange 94 may then be placed over the pipes 100 and bolted to the pipe flanges 108. The lower flange 94 may be sectioned to be able to pass through a manway, and then can be assembled and bolted in place. A gasket may be placed on the upper flange 92 and is ready for a final cover such as a top screen 90. The top screen 90 may then be seated over the gasket and bolted into place. The top screen 90 may have a flow control surface to match the performance of the panels 60. The panels may be checked for full bearing directly on the lower vessel head 44 and shimmed, if necessary. Connections for tie bolts may be slotted to allow for thermal expansion and connect all the panels 60 into one assembly so no panel 60 can lift relative to the others.

FIGS. 10-14 show another embodiment of a support grid assembly 200. This support grid assembly 200, like the previous embodiments, may include one or more grid panels 210 coupled to a center manifold 212. The manifold 212 may include a manifold base 214, a manifold grid connection piece 216 or body, and a manifold top plate 218. The manifold 212 may be coupled to an outlet pipe 220 using a screen and pipe closure bolting ring 222. In this embodiment the outlet pipe 220 extends upward from the manifold 212, bends at 90 degrees, and extends through an opening 222 in the side of the vessel 42. Outside of the vessel 42, one way to connect the outlet pipe 220 to an adjacent pipe may be with a sandwich flange 224 and a spiral wound gasket 226.

In some embodiments and as shown in the support grid assembly 200 of FIGS. 10-14, a connection interface may be provided that allows expansion and contraction of components of the assembly and may permit angular deflection between components. In the embodiment shown, such a connection interface is a bellows and facilitates installation of the support grid assembly 200. A bellows element 230 may be provided in, or in line with, the outlet pipe 220, in this case oriented vertically in a vertical portion of pipe 231, to be hydraulically interposed between the manifold outlet and the outlet pipe 220. Bellows elements 232 may also be provided at the connection of each panel 210 to the manifold grid connection piece 216, also oriented vertically, in tubular connections or pipes 234. The bellows elements 230, 232 serve at least two functions. First, the manifold 212 may not be perfectly installed, either as the result of variability in manufacturing, or because of its mounting in the vessel head 44. This variability may cause the location, angle, or both of the manifold 212 to be out of position from ideal. The outlet pipe 220 has a fixed position to reach and connect to outside the vessel 42, and where connections are made with flanges there is little tolerance for varied positioning. The bellows elements 230, 232 provide the ability of horizontal and vertical motion travel, as well as angular adjustment, to address variability of configuration of the components. Second, the bellows elements 230, 232 address thermal cycling and the accompanying expansion and contraction of parts. Temperature changes, which may be frequent and extreme depending on the process, may cause fatigue or weakening of the parts, and loosening of connections, among other things. The bellows elements 230, 232 or alternatively, joints selected by one of ordinary skill in the art, may account for expansion and contraction of the other parts. Examples of other such joints may include telescoping parts with gaskets and flexible tubing or hose.

In this embodiment of a support grid assembly 200, the tubular connections or pipes 234 may be configured such that fluid flows through the pipes 234 in the same direction as fluid flows through the manifold outlet; flow may be directed upward through the manifold 212. Again, the tubular connections or pipes 234 may also include or instead be fittings such as bends or other types of duct connections. Flow may be in either direction, from the vessel 42 into the panels 210, into the manifold 212 to the outlet pipe 220, or into the manifold 212 from an inlet pipe (the same as outlet pipe 220), distributed to the panels 210, and into the vessel 42.

The material of the components of the support grid assemblies 40, 200 disclosed herein may be selected as appropriate for the process application. In one embodiment the material may be AISI 304 stainless steel. Bellows elements 230, 232 may be selected based on the process application, and one example of a supplier of bellows that may be appropriate is U.S. Bellows, Inc.

Figure 10:
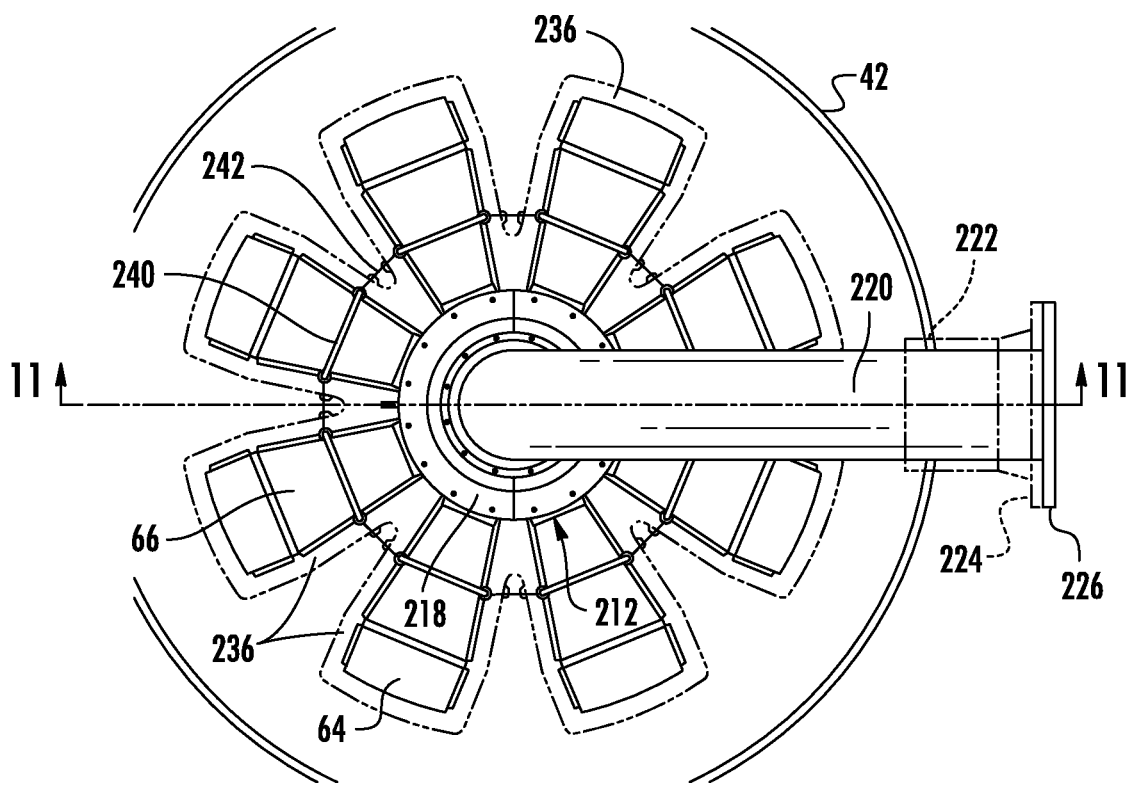
FIG. 10 is a plan view of another embodiment of a support grid assembly disposed in a vessel head.
Figure 11:
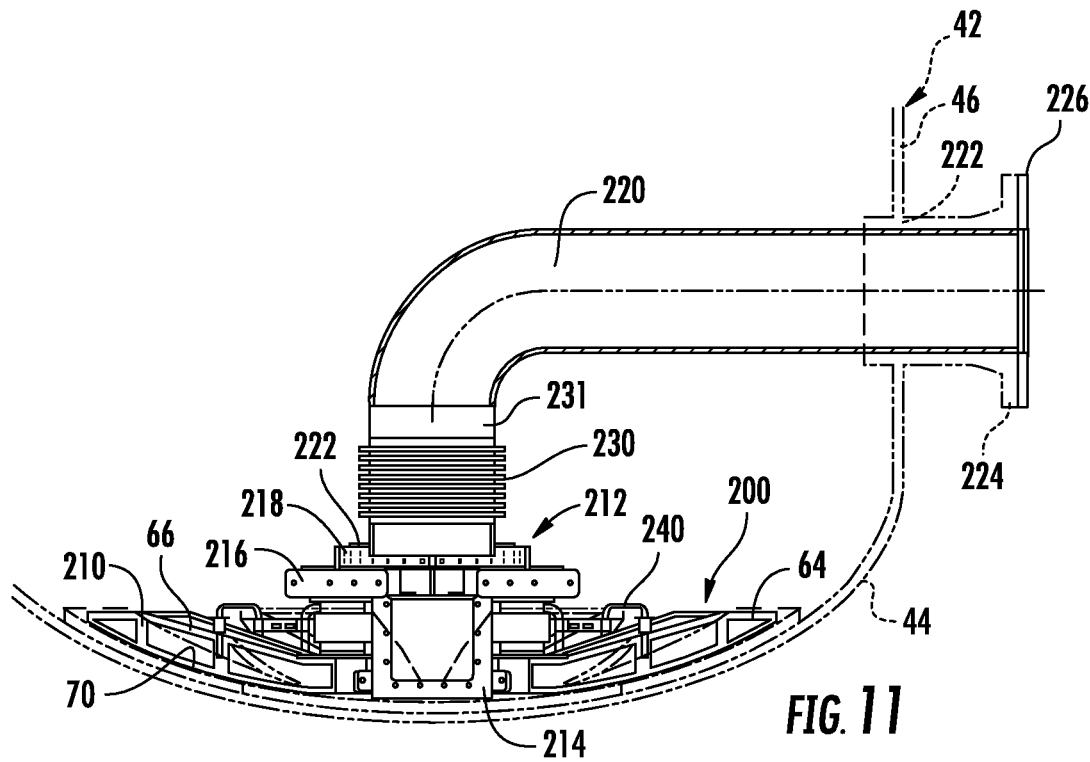
FIG. 11 is a section view of the support grid assembly of FIG. 10 taken along line 11-11 of FIG. 10.
Figure 12:
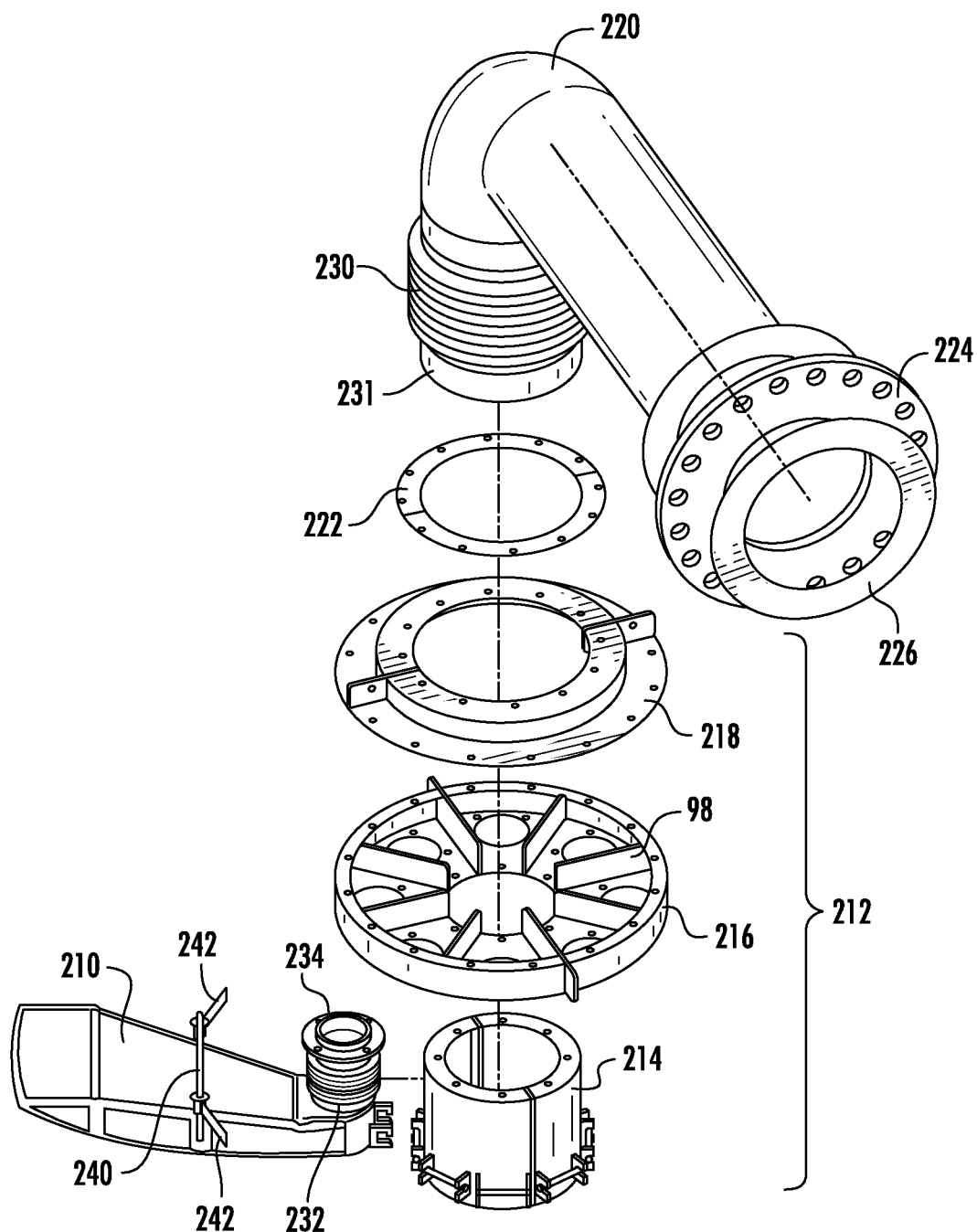
FIG. 12 is an exploded view of the support grid assembly of FIG. 10.

The support grid assembly 200 may be supported by a layer of compressible material, such as an insulation blanket 236 (FIGS. 10 and 11). The insulation blanket 236 may be provided between the support grid assembly 200 and the floor of the vessel head 44, and may fill the void or gaps that may exist between these features. In this embodiment, the insulation blanket 236 is shaped to approximate or be slightly larger than the footprint of the panels 210. Appropriate materials may include elastic materials, such as elastomers, or thermal gaskets, like texturized fiberglass yarn such as Tetraglas® (TETRAGLAS is a registered trademark of Darca Southern, Inc.). The material may be selected based on characteristics that permit the filling of voids between the panels 210 and the vessel head 44 floor, while providing support for the panels 210, as, for example, some resilient materials might provide. In addition, the material should be selected as appropriate for the process application the material will be exposed to, such as harsh chemicals, fuels, or extreme heat. In one embodiment the insulation blanket 236 is 1-inch thick Tetraglas®.

Figure 13:
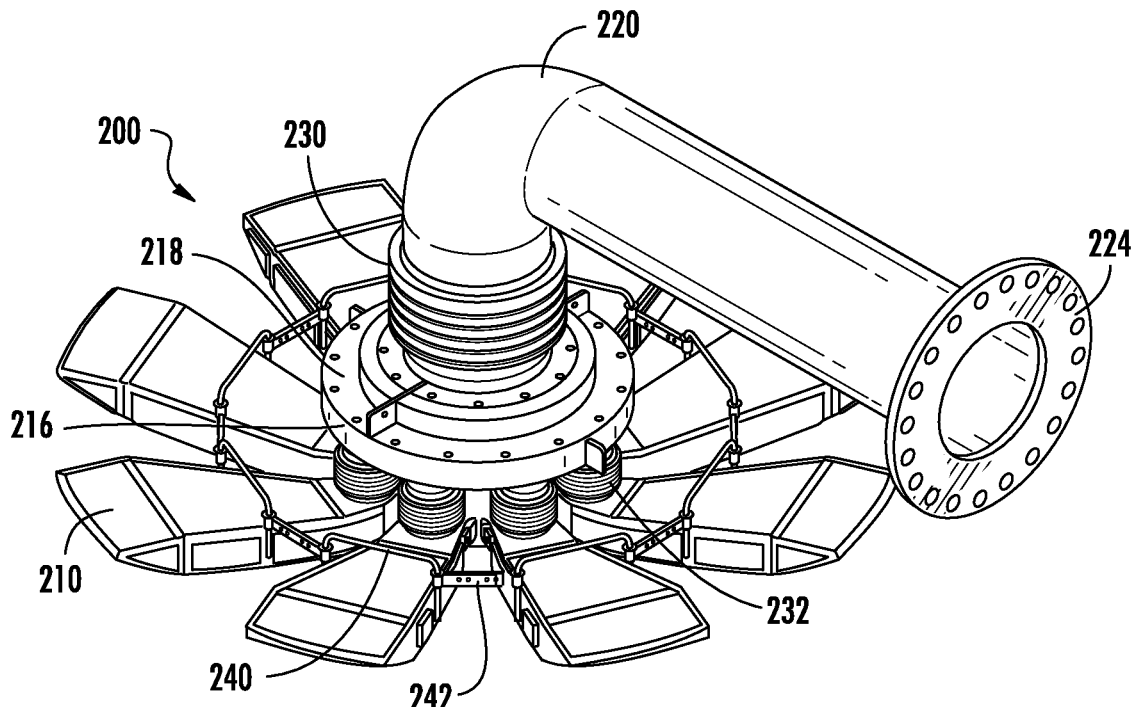
FIG. 13 is a perspective view of the support grid assembly of FIG. 10.
Figure 14:
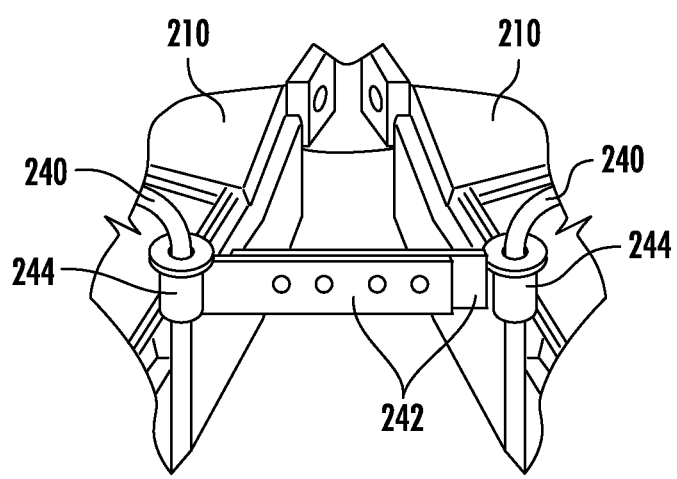
FIG. 14 is a detail view of a connection of panels of the support grid assembly of FIG. 10.

Support bars 240 may be provided. The support bars 240 may have one function of serving as a handle or lifting point for each panel 210. The support bars 240 of this embodiment, however, may also provide a connection point for tying the panels 210 together. The support bars 240 are attached at each end to a side of a panel 210, which may be done by welding or otherwise. As shown in FIG. 13, and in more detail in FIG. 14, each of the vertical portions at the ends of the support bars 240 has a swing arm 242 attached to it. At one end, the swing arms 242 have a sleeve 244 that goes around the support bar 240 and permits the arm 242 to pivot. At the other end the swing arm 242 is free. The swing arm 242 of one panel 210 is pivoted to meet the swing arm 242 of the adjacent panel 210, and the arms 242 are bolted to together as may be seen in FIG. 14. This may be repeated around the entire support grid assembly 200 to connect all of the panels 210 to each other. This may eliminate the rigid connections 17 shown in FIG. 2 to provide flexibility in the installation.

The support grid assembly features described herein may allow using the vessel as a support structure, thereby eliminating or reducing the need for additional support elements, such as beams or rings that could be added to the vessel for support. The low profile of the support grid assembly may also increase the amount of useable volume in the vessel for media. The support grid assembly may further include integrated flow control vanes in the panels and the manifold to control and distribute fluid flow through the assembly in both the inlet and outlet directions.

One use of the support grid assemblies disclosed herein may be to be installed into the bottom head of hydroprocessing or gas dehydration vessels, which may promote liquid and gas flow, bed utilization, distribution and an overall efficient process. The support grid assemblies may lie directly on the bottom head surface, and may allow for substantially all or the entire volume to be filled with media. Increased bed volume may allow for the conversion of existing vessels to achieve higher process capacity and new vessels to be built shorter in shell length. An enclosed stainless steel bottom surface of the panels may prevent bed material from migrating under one of the panels and leaking into the flow of the process. For systems with coking potential, a Vee-Wire® screen surface or wedge wire screen surface, for example, can be applied to the bottom and may eliminate dead areas, retaining catalyst on the bottom surfaces. The vessel head may support the grid directly to create a strong and rigid structure without adding special ledge rings or heavy beams to the vessel.

Each panel may be a totally enclosed element with a bolted and gasketed connection to the manifold. The enclosed design may allow the grid assembly to expand and contract under the bed without compromising an outer perimeter seal, which may happen in a cyclic gas dehydration application. During the down flow operation, the tapered design of the panels may collect flow from substantially all of or the entire cross section of the vessel and moves it toward the center hub outlet, and may produce a substantially uniform flow across the entire vessel and promote bed utilization relative to traditional bed support systems. Away from the vessel centerline, the volumes of catalyst or sieve may be greater. The panel may match the configuration shape of the vessel head, collecting flow from all areas uniformly without having to cover the entire cross section of the vessel.

Although specific embodiments have been illustrated and described herein, those of ordinary skill in the art appreciate that any arrangement which is calculated to achieve the same purpose may be substituted for the specific embodiments shown and that the embodiments herein have other applications in other environments. This application is intended to cover any adaptations or variations of the present disclosure. The following claims are in no way intended to limit the scope of the disclosure to the specific embodiments described herein. While the foregoing is directed to embodiments of a support grid assembly and components, other and further embodiments may be devised without departing from the basic scope thereof, and the scope thereof is determined by the claims that follow.

What is claimed is:

1. A support grid assembly for use in a vessel including a wall with an inner surface, the support grid assembly comprising:

at least one panel including a first wall and a second wall, the first wall including a first screen section and a second screen section, the first and the second screen sections configured to support a media and defining a filtering surface of the first wall, and the second wall configured to be supported by the inner surface of the wall of the vessel, wherein one or more flow control vanes are positioned between the first wall and the second wall, said one or more control vanes supporting the first and the second screen sections and wherein at least a portion of each flow control vane is parallel to a longitudinal axis of each panel, wherein the first screen section is adapted to extend to the vessel body;

wherein the first screen section and the second screen section are not found on the same plane; and a manifold coupled to and in hydraulic communication with the at least one panel via a tubular connection, the manifold configured to be in hydraulic communication with an inlet or outlet of the vessel with said second screen section sloping downward to the manifold.

2. The support grid assembly of claim 1, wherein and at least a portion of the second wall of the at least one panel forms a bottom surface that is curved to substantially conform to a curvature of the inner surface of the wall of the vessel, or a combination thereof.

3. The support grid assembly of claim 2, wherein the at least one panel comprises a plurality of panels coupled to and in hydraulic communication with the manifold.

4. The support grid assembly of claim 3, wherein the manifold and the plurality of panels are configured to permit fluid to flow in a first direction through openings in the screen, through the at least one panel, into the manifold, and through the manifold directed to the outlet of the vessel, in a second, reverse direction, or in both directions.

5. The support grid assembly of claim 1, wherein the manifold includes an outlet that directs flow to the outlet of the vessel, and the tubular connection and manifold outlet are configured such that fluid flows through the tubular connection in a direction opposite fluid flow through the manifold outlet.

6. The support grid assembly of claim 5 wherein the manifold outlet is configured to direct flow downward.

7. The support grid assembly of claim 2, wherein the manifold has an upper end and a top screen is mounted to the upper end of the manifold.

8. The support grid assembly of claim 1, wherein the manifold includes an outlet that directs flow to the outlet of the vessel, and the tubular connection and manifold outlet are configured such that fluid flows through the tubular connection in the same direction as fluid flow through the manifold outlet.

9. The support grid assembly of claim 5, wherein the manifold outlet is configured to direct flow upward.

10. The support grid assembly of claim 1, wherein the tubular connection is at a connection interface, and comprises a bellows element or a joint that allows expansion and contraction of components around the connection interface.

11. The support grid assembly of claim 3, wherein the panels are arranged in a circular configuration extending radially from the manifold, and the panels have a proximal end near the manifold and an opposite, wider distal end.

12. The support grid assembly of claim 3, wherein the second wall of at least one panel includes a screen.

13. The support grid assembly of claim 3, wherein all walls of at least one panel each include a screen.

14. The support grid assembly of claim 3, further comprising a layer of compressible material configured to be interposed between the bottom surface of the panels and the inner surface of the vessel, wherein when the support grid assembly is installed in the vessel, the bottom surface of the panels engages the layer of compressible material and the layer of compressible material engages the inner surface of the vessel.

15. The support grid assembly of claim 14, wherein the layer of compressible material comprises a thermal gasket.

16. The support grid assembly of claim 14, wherein the layer of compressible material comprises textured fiberglass yarn.

17. The support grid assembly of claim 3, further comprising a bellows element or a joint that allows expansion and contraction hydraulically interposed between the manifold and the inlet or outlet of the vessel.

18. The support grid assembly of claim 3, wherein each panel includes a side extending substantially radially from proximate to the manifold, and a swing arm is pivotally mounted to a side of at least two adjacent panels for attaching to a swing arm of the adjacent panel.

19. The support grid assembly of claim 18, wherein a support bar is mounted to the side of each panel, and the swing arm is mounted to the side of each adjacent panel by being pivotally mounted to the support bar.

20. The support grid assembly of claim 3, wherein each panel includes a side extending substantially radially from proximate to the manifold and a support bar is mounted to the side of each panel.

21. The support grid assembly of claim 3, further comprising a rod mounted to the manifold and a support member defining a channel and hook pinion mounted to the panel, wherein the rod is received in the channel and hook portion to couple the panel to the manifold.

* * * * *

UNITED STATES PATENT AND TRADEMARK OFFICE
CERTIFICATE OF CORRECTION

| | | |
|---|---|---|
| PATENT NO. | : 10,933,353 B2 | Page 1 of 1 |
| APPLICATION NO. | : 13/952113 | |
| DATED | : March 2, 2021 | |
| INVENTOR(S) | : Saul et al. | |

It is certified that error appears in the above-identified patent and that said Letters Patent is hereby corrected as shown below:

In the Claims

Column 13, Line 3, delete "and"

Signed and Sealed this
Thirteenth Day of July, 2021

Drew Hirshfeld
*Performing the Functions and Duties of the*
*Under Secretary of Commerce for Intellectual Property and*
*Director of the United States Patent and Trademark Office*